UNITED STATES PATENT OFFICE.

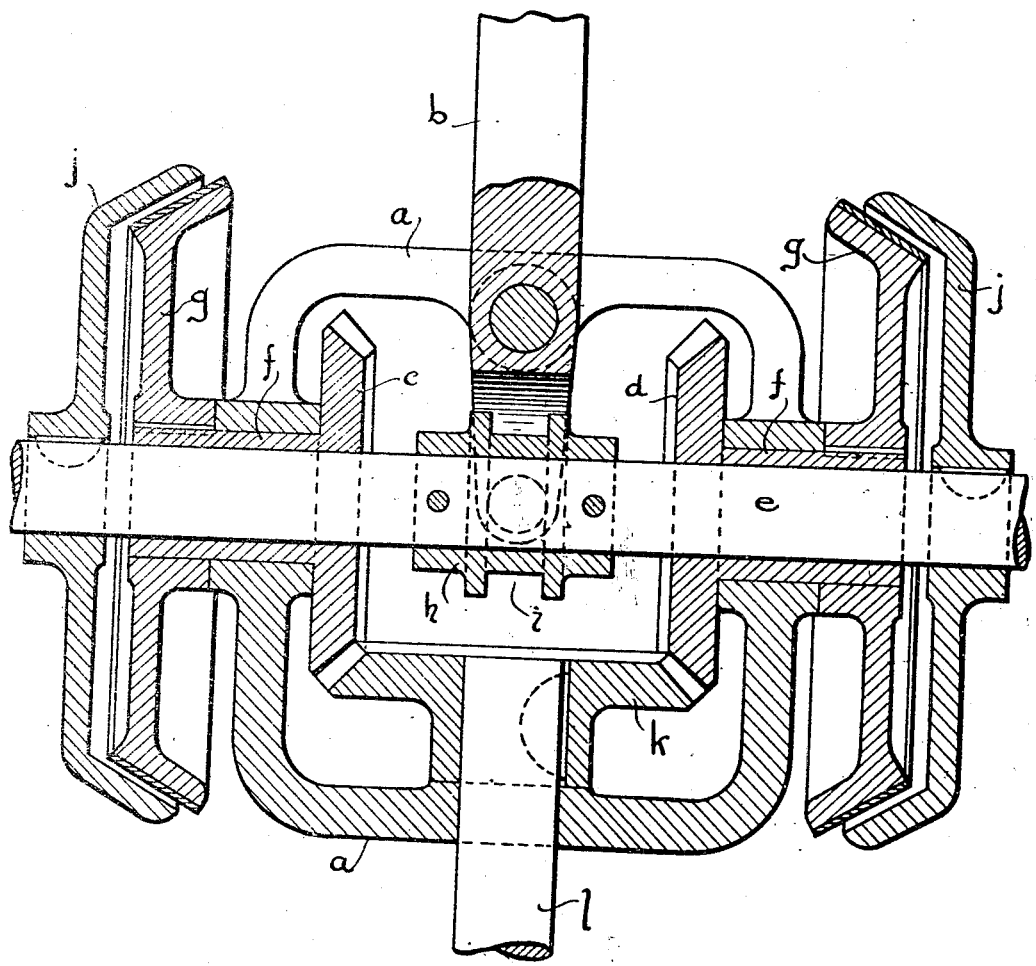

FRANK E. BAKER, OF ROYAL OAK, MICHIGAN, ASSIGNOR TO DETROIT TRACTOR COMPANY, OF LA FAYETTE, INDIANA, A CORPORATION OF INDIANA.

TRANSMISSION-GEARING.

1,120,665.                Specification of Letters Patent.          Patented Dec. 15, 1914.

Application filed October 18, 1913.  Serial No. 795,847.

*To all whom it may concern:*

Be it known that I, FRANK E. BAKER, a citizen of the United States, residing at Royal Oak, county of Oakland, State of Michigan, have invented a certain new and useful Improvement in Transmission-Gearing, and declare the following to be a full, clear, and exact description of the same, such as will enable others skilled in the art to which it pertains to make and use the same, reference being had to the accompanying drawings, which form a part of this specification.

This invention relates to transmission gearing and especially to steering gear for tractors or other heavy vehicles.

It has for its object a form of gearing capable of use with this type of vehicle and in which sufficient friction surface is provided on cone clutches to insure the operation of the mechanism regardless of unusual resistance.

In the drawings, the figure represents a sectional view of the mechanism.

Heavy tractors for farm use require considerable power for the turning of the traction wheels. It is found desirable to utilize the power of the machine for turning the traction wheels. In another application I have shown the use of a multiple disk clutch for this purpose. The ordinary cone clutch will not work satisfactorily because of the considerable resistance to turning that is often caused by wheels sinking into the ground. It is not possible to use a cone clutch of sufficient diameter on the ordinary arrangement of the steering pinions and the steering post. To secure the use of a large cone clutch I have arranged the mechanism as shown in the drawings.

$a$ represents a frame to which is pivoted the shifting fork $b$. The frame comprises a bar in the form of a double yoke or endless bar. This frame also journals the pinions $c$ and $d$ having hubs $f$ that extend through alined bearings of the frame to the outside where they are keyed to the male clutch parts $g$. The shifting head $h$ is pinned to the shaft $e$ and provided with an annular race $i$ in which the forked part of the shifting fork $b$ engages. The shaft $e$ extends through the frame to the outside on either side and beyond the male clutch parts $g$. On each side of the clutch $b$ is another clutch part or cup $j$. These cup parts $j$ are keyed to the shaft $e$.

The shaft is shiftable one way or the other in the frame $a$ to bring either one or the other of the cups $j$ into engagement with its companion conical clutch part $g$. This connects the power with either one or the other of the pinions $c$ and $d$. These pinions $c$ and $d$ are unconnected with the power shaft $e$ until one or the other of the clutches is thrown into operation. Thereupon either one or the other of the pinions is operatively connected with the shaft $e$ and drives the gear $k$ upon the steering post $l$. The steering post is journaled in a third bearing intermediate of the lower half of the frame and having its axis perpendicular to the axes of the alined bearings. The other pinion of course rotates idly.

What I claim is:

1. The combination of a yoke-like frame connecting two alined bearings, said frame near its mid point having a third bearing with its axis perpendicular to the axes of the alined bearings, a rotatable post journaled in the third bearing, a beveled gear upon the end of the rotatable post within the said frame, two beveled pinions meshing with said gear on opposite sides and provided with hubs, the said pinions being inside of the frame and the hub of one pinion journaled in each of the two alined bearings and protruding to the outside of the frame, a clutch part of greater diameter than the width of the frame attached to each hub on the outside of the frame, a companion clutch part located adjacent each of the first-mentioned clutch parts, a shiftable power shaft passing freely through the pinions and hubs and to which each of the companion clutch parts is fast, and means for shifting the power shaft either way.

2. The combination of a frame, comprising an endless frame bar, said frame being provided with a pair of alined bearings, and the frame at one side of the alined bearings having a third bearing with its axis perpendicular to the axes of the alined bearings, a rotatable post journaled in the third bearing, a beveled gear carried on the end of the post and within the frame, two beveled pinions meshing with the beveled gear on opposite sides and provided with hubs, the said pinions being located inside of the frame, the hub of one pinion journaled in each of the two alined bearings and protruding to the outside of the frame, a clutch part of greater diameter than the width of the frame attached to each hub on the outside of the frame, a companion clutch part located adjacent each of the first-mentioned clutch parts, a shiftable power shaft passing freely through the pinions and hubs and to which each of the companion clutch parts is fast, a shifting head fast to the power shaft within the frame and between the two pinions, and a shifting fork pivoted to the frame opposite the third bearing.

In testimony whereof, I sign this specification in the presence of two witnesses.

FRANK E. BAKER.

Witnesses:
STUART C. BARNES,
MARIETTA E. RUDD.